US008368638B2

(12) United States Patent
Yun

(10) Patent No.: US 8,368,638 B2
(45) Date of Patent: Feb. 5, 2013

(54) LIQUID CRYSTAL DISPLAY DEVICE AND METHOD FOR CONTROLLING BACK-LIGHT BRIGHTNESS

(75) Inventor: Ju Ho Yun, Gumi-si (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 12/741,291

(22) PCT Filed: Nov. 3, 2008

(86) PCT No.: PCT/KR2008/006469
§ 371 (c)(1),
(2), (4) Date: Jul. 15, 2010

(87) PCT Pub. No.: WO2009/061107
PCT Pub. Date: May 14, 2009

(65) Prior Publication Data

US 2010/0295877 A1 Nov. 25, 2010

(30) Foreign Application Priority Data

Nov. 5, 2007 (KR) ........................ 10-2007-0112199

(51) Int. Cl.
*G09G 3/36* (2006.01)
*G09G 5/00* (2006.01)
*G06F 3/038* (2006.01)
*G02F 1/1335* (2006.01)
*G09F 13/04* (2006.01)
*G09F 13/08* (2006.01)

(52) U.S. Cl. ......... 345/102; 345/204; 349/61; 362/97.1; 362/97.2

(58) Field of Classification Search .................. 345/102, 345/204; 349/61-71; 362/97.1-97.3
See application file for complete search history.

(56) References Cited

U.S. PATENT DOCUMENTS 5,488,434 A 1/1996 Jung ............................ 348/725
(Continued)

FOREIGN PATENT DOCUMENTS

JP 07-129113 A 5/1995
JP 2006-276692 10/2006
(Continued)

OTHER PUBLICATIONS

International Search Report issued in PCT/KR2008/006469 dated Jun. 3, 2009.

(Continued)

*Primary Examiner* — Bipin Shalwala
*Assistant Examiner* — Ilana Spar
(74) *Attorney, Agent, or Firm* — KED & Associates LLP

(57) ABSTRACT

The present invention relates to a liquid crystal display and method of preventing dazzling thereof, by which human eyes can be prevented from being fatigued by the intensity of radiation in a manner of detecting APL of an LCD TV and correcting brightness of a backlight. The present invention includes an APL detecting unit detecting APL of the liquid crystal display, a control unit increasing or decreasing a brightness of a backlight uniformly in inverse proportional to the APL value detected by the APL detecting unit, the control unit increasing the brightness of the backlight according to a decrement of the APL value by limiting the brightness of the backlight to a prescribed brightness for a preset reference section, and a backlight driving unit driving the backlight by controlling the brightness of the backlight under the control of the control unit.

18 Claims, 7 Drawing Sheets

U.S. PATENT DOCUMENTS

| | | | | |
|---|---|---|---|---|
| 2006/0221260 | A1 | 10/2006 | Fujine et al. | 348/790 |
| 2007/0126757 | A1 | 6/2007 | Itoh et al. | |
| 2008/0117153 | A1 * | 5/2008 | Fujine et al. | 345/89 |
| 2008/0221877 | A1 * | 9/2008 | Sumita | 704/211 |
| 2009/0167658 | A1 | 7/2009 | Yamane et al. | 345/89 |
| 2009/0262063 | A1 * | 10/2009 | Fujine et al. | 345/102 |

FOREIGN PATENT DOCUMENTS

| | | | |
|---|---|---|---|
| WO | WO 2007/029420 | A1 | 3/2007 |
| WO | WO 2007/046320 | | 4/2007 |
| WO | WO 2007/055131 | | 5/2007 |
| WO | WO 2007055131 | A1 * | 5/2007 |

OTHER PUBLICATIONS

European Search Report dated Jul. 10, 2012 issued in Application No. 08 84 7496.

* cited by examiner

LIQUID CRYSTAL DISPLAY DEVICE AND METHOD FOR CONTROLLING BACK-LIGHT BRIGHTNESS

TECHNICAL FIELD

The present invention relates to a display, and more particularly, to a liquid crystal display and method of controlling brightness of a backlight thereof. Although the present invention is suitable for a wide scope of applications, it is particularly suitable for preventing human eyes from being fatigued by the intensity of radiation in a manner of maintaining the intensity of radiation at a constant level by correcting the brightness of the backlight according to an average picture level (APL) of an LCD TV.

BACKGROUND ART

Recently, as high-end products are manufactured with massive information representation, liquid crystal displays (hereinafter abbreviated LCDs) are globally used for portable video cameras, TVs, computer monitors, mobile phones, vehicle navigation systems and the like.

LCD is a light-receiving display that forms a picture by receiving external light. And, light is applied by a backlight provided to a backside of the LCD. The backlight uses a lamp as a light source. In particular, the backlight converts the light of the lamp to planar light having the same brightness and then applies the planar light to an LCD screen.

The general requirements of the backlight include high brightness, high efficiency, uniformity of brightness, long durability, slimness, light weight and low price. In particular, a high brightness characteristic is required for an LCD or TV monitor. As mentioned in the above description, since a backlight is not a self-luminescent display device, a lamp is adopted for the backlight. Therefore, the brightness of an LCD screen is determined by a voltage of an LCD driver, which is supplied by an external circuit.

DISCLOSURE OF THE INVENTION

Technical Problem

However, as a brightness controller of the related art LCD maintains a constant brightness, it is difficult to vary a brightness of an LCD panel arbitrarily. In order to emphasize a clearer or sharper image quality, an LCD TV tends to raise a brightness of a screen by improving luminance. Yet, when a user watches a TV for a considerable period of time at home, if a screen is too bright, the intensity of radiation, which stimulates user's eyes according to a time-varying video signal, keeps varying to cause fatigue to the user's eyes.

Technical Solution

Accordingly, the present invention is directed to a liquid crystal display and method of controlling brightness of a backlight thereof that substantially obviate one or more of the problems due to limitations and disadvantages of the related art.

An object of the present invention is to provide a liquid crystal display and method of controlling brightness of a backlight thereof, by which fatigue of eyes stimulated by the intensity of radiation can be prevented in a manner of detecting APL of a liquid crystal display (LCD) TV and then correcting brightness of a backlight according to the detected APL.

Advantageous Effects

Accordingly, an apparatus and method for controlling backlight brightness of a display of the present invention provide the following effects or advantages.

First of all, in an LCD TV, when a viewer watches a TV, if a screen is too bright or the intensity of light stimulating viewer's eyes varies according to a picture on the screen, fatigue is caused to the eyes to become one of problems caused by the LCD TV. To prevent this problem, the fatigue caused to the eyes is reduced by maintaining the intensity of radiation stimulating the eyes uniformly, whereby the dazzling problem of the LCD TV is solved to settle the inconvenience caused to viewers. Therefore, the viewer's health can be secured and the enhanced functions of the LCD TV can be implemented.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Figure 1:
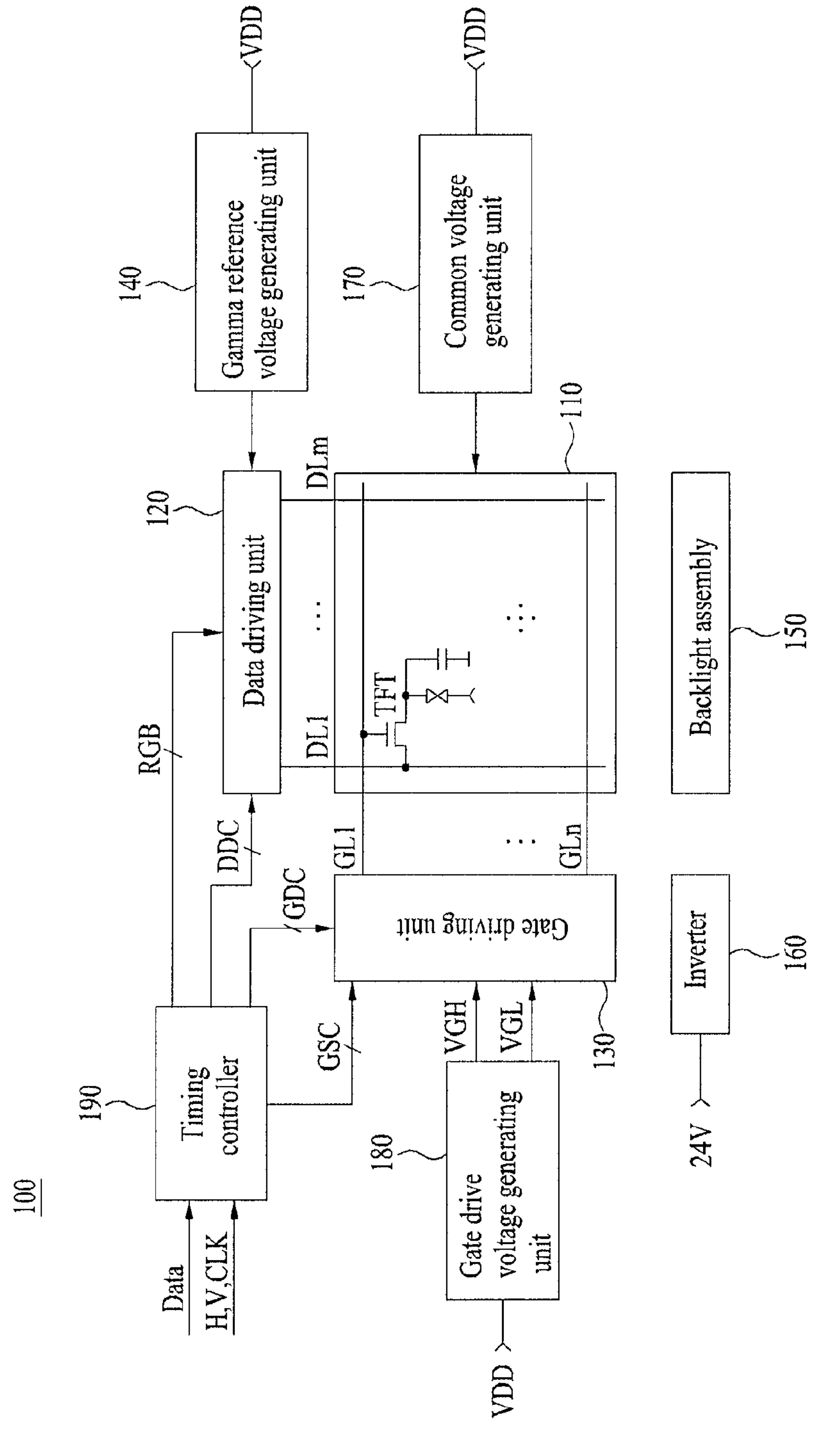
FIG. 1 is a block diagram of a liquid crystal display according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of controlling a backlight brightness of a liquid crystal display according to the present invention includes the steps of inputting a video signal by a frame unit, detecting an average picture level (APL) value of the inputted video signal, if the detected average picture level (APL) value is equal to or greater than a reference value, increasing or decreasing a brightness of a backlight according to an inverse proportional curve having a prescribed proportional constant, and if the detected average picture level (APL) value is smaller than a reference value, increasing the brightness of the backlight according to the average picture level (APL) value by limiting the brightness of the backlight to a prescribed brightness for a preset reference section of an average picture level (APL).

Preferably, the inverse proportional curve having the prescribed proportional constant (L) is represented as a formula: Backlight brightness=1/(L*screen size*APL), where L is a constant of brightness stimulating eyes.

Preferably, if the detected average picture level (APL) is decremented smaller than the reference value, the brightness of the backlight is decreased to a value for avoiding light leakage only.

Preferably, the method further includes the steps of if the detected average picture level (APL) is equal to or greater than the reference value, measuring a surrounding brightness of the liquid crystal display, comparing the measured surrounding brightness to a set reference value, and if the measured surrounding brightness is greater than the reference value, increasing or decreasing the brightness of the backlight according to an inverse proportional curve greater than the prescribed proportional constant.

More preferably, the method further includes the step of if the measured surrounding brightness is smaller than the reference value, increasing or decreasing the brightness of the backlight according to an inverse proportional curve smaller than the prescribed proportional constant.

Preferably, the method further includes the steps of if the detected average picture level (APL) is equal to or greater than the reference value, measuring a viewing distance of a user from the liquid crystal display, comparing the measured viewing distance to a set reference value, and if the measured viewing distance is greater than the reference value, increasing or decreasing the brightness of the backlight according to an inverse proportional curve greater than the prescribed proportional constant.

More preferably, the method further includes the step of if the measured viewing distance is smaller than the reference value, increasing or decreasing the brightness of the backlight according to an inverse proportional curve smaller than the prescribed proportional constant.

To further achieve these and other advantages and in accordance with the purpose of the present invention, a liquid crystal display includes a video signal input unit for inputting a video signal by a frame unit, the video signal input unit outputting the inputted video signal as video data by a frame unit, an APL detecting unit detecting an average picture level (APL) value of the video data outputted from the video signal input unit, a control unit, if the detected average picture level (APL) value is equal to or greater than a reference value, the control unit increasing or decreasing a brightness of a backlight according to an inverse proportional curve having a prescribed proportional constant, the control unit, if the detected average picture level (APL) value is smaller than a reference value, the control unit increasing the brightness of the backlight according to the average picture level (APL) value by limiting the brightness of the backlight to a prescribed brightness for a preset reference section of an average picture level (APL), a memory storing a lookup table (LUT) for mapping a backlight brightness control value corresponding to the average picture level (APL) value, and a backlight driving unit driving the backlight by controlling the brightness of the backlight under the control of the control unit.

More preferably, the inverse proportional curve having the prescribed proportional constant (L) is represented as a formula: Backlight brightness=1/(L*screen size*APL), where L is a constant of brightness stimulating eyes.

More preferably, if the detected average picture level (APL) is decremented smaller than the reference value, the control unit controls the brightness of the backlight to be decreased to a value for avoiding light leakage only.

To further achieve these and other advantages and in accordance with the purpose of the present invention, a liquid crystal display includes a video signal input unit for inputting a video signal by a frame unit, the video signal input unit outputting the inputted video signal as video data by a frame unit, an APL detecting unit detecting an average picture level (APL) value of the video data outputted from the video signal input unit, an external brightness detecting unit detecting a surrounding brightness value of the liquid crystal display, a control unit, if the detected average picture level (APL) value is equal to or greater than a reference value based on the measured surrounding brightness value, the control unit increasing or decreasing a brightness of a backlight according to an inverse proportional curve having a prescribed proportional constant, the control unit, if the detected average picture level (APL) value is smaller than a reference value, the control unit increasing the brightness of the backlight according to the average picture level (APL) value by limiting the brightness of the backlight to a prescribed brightness for a preset reference section of an average picture level (APL), a memory storing a lookup table (LUT) for mapping the average picture level (APL) value and a backlight brightness control value corresponding to the surrounding brightness value, and a backlight driving unit driving the backlight by controlling the brightness of the backlight under the control of the control unit.

Preferably, if the detected average picture level (APL) is decremented smaller than the reference value, the control unit controls the brightness of the backlight to be decreased to a value for avoiding light leakage only.

Preferably, if the detected average picture level (APL) is equal to or greater than the reference value and if the measured surrounding brightness value is greater than a set reference value, the control unit increases or decreases the brightness of the backlight according to an inverse proportional curve greater than the prescribed proportional constant.

Preferably, if the detected average picture level (APL) is equal to or greater than the reference value and if the measured surrounding brightness value is smaller than a set reference value, the control unit increases or decreases the brightness of the backlight according to an inverse proportional curve smaller than the prescribed proportional constant.

Preferably, the external brightness detecting unit measures the surrounding brightness value and then outputs a dimming vector value.

To further achieve these and other advantages and in accordance with the purpose of the present invention, a liquid crystal display includes a video signal input unit for inputting a video signal by a frame unit, the video signal input unit outputting the inputted video signal as video data by a frame unit, an APL detecting unit detecting an average picture level (APL) value of the video data outputted from the video signal input unit, a viewing distance detecting unit detecting a viewing distance of a viewer from the liquid crystal display, a control unit, if the detected average picture level (APL) value is equal to or greater than a reference value based on the measured viewing distance, the control unit increasing or decreasing a brightness of a backlight according to an inverse proportional curve having a prescribed proportional constant, the control unit, if the detected average picture level (APL) value is smaller than a reference value, the control unit increasing the brightness of the backlight according to the average picture level (APL) value by limiting the brightness of the backlight to a prescribed brightness for a preset reference section of an average picture level (APL), a memory storing a lookup table (LUT) for mapping the average picture level (APL) value and a backlight brightness control value corresponding to the viewing distance, and a backlight driving unit driving the backlight by controlling the brightness of the backlight under the control of the control unit.

Preferably, if the detected average picture level (APL) is decremented smaller than the reference value, the control unit controls the brightness of the backlight to be decreased to a value for avoiding light leakage only.

Preferably, if the detected average picture level (APL) is equal to or greater than the reference value and if the measured viewing distance is greater than a set reference value, the control unit increases or decreases the brightness of the backlight according to an inverse proportional curve greater than the prescribed proportional constant.

Preferably, if the detected average picture level (APL) is equal to or greater than the reference value and if the measured viewing distance is smaller than a set reference value, the control unit increases or decreases the brightness of the backlight according to an inverse proportional curve smaller than the prescribed proportional constant.

Preferably, the viewing distance detecting unit detects the viewing distance resulting from a time difference of a reflective wave reflecting from the viewer using an ultrasonic wave transceiver.

It is to be understood that both the foregoing general description and the following detailed description are exemplary and explanatory and are intended to provide further explanation of the invention as claimed.

Mode For Invention

Reference will now be made in detail to the preferred embodiments of the present invention, examples of which are illustrated in the accompanying drawings.

FIG. 1 is a block diagram of a liquid crystal display according to an embodiment of the present invention. In particular, a configuration of a liquid crystal display provided with pixels having the above structure is explained as follows.

Referring to FIG. 1, a liquid crystal display 100 includes a liquid crystal display panel 110 having a thin film transistor (TFT) for driving a liquid crystal cell Clc formed at each intersection between data lines DL1 to DLm and gate lines GL1 to GLn, a data driving unit 120 for supplying data to the data lines DL1 to DLm of the liquid crystal display panel 110, a gate driving unit 130 for supplying a scan pulse to the gate lines GL1 to GLn of the liquid crystal display panel 110, a gamma reference voltage generating unit 140 generating a gamma reference voltage to supply to the data driving unit 120, a backlight assembly 150 for applying light to the liquid crystal display panel 110, an inverter 160 for applying AC and DC to the backlight assembly 150, a common voltage generating unit 170 generating a common voltage Vcom to supply to a common electrode of the liquid crystal cell Clc of the liquid crystal display panel 110, a gate drive voltage generating unit 180 generating a gate high voltage VGH and a gate low voltage VGL to supply to the gate driving unit 130, and a timing controller 190 for controlling the data driving unit 120 and the gate driving unit 130.

The liquid crystal display panel 110 includes a pair of glass substrates between which liquid crystals are injected. The data lines DL1 to DLm and the gate lines GL1 to GLn are formed on the lower glass substrate by crossing with each other. And, the TFT is provided to each intersection between the data lines DL1 to DLm and the gate lines GL1 to GLn. The TFT responds to the scan pulse and then supplies the liquid crystal cell Clc with the data on the data lines DL1 to DLm. A gate electrode of the TFT is connected to a corresponding one of the gate lines GL1 to GLn. And, a source electrode of the TFT is connected to a corresponding one of the data lines DL1 to DLm. Moreover, a drain electrode of the TFT is connected to a pixel electrode and a storage capacitor Cst of the liquid crystal cell Clc.

The TFT is turned on in response to the scan pulse supplied to the gate terminal via a corresponding one of the gate lines GL1 to GLn. When the TFT is turned on, video data on a corresponding one of the data lines DL1 to DLm is supplied to the pixel electrode of the liquid crystal cell Clc.

The data driving unit 120 supplies data to the data lines DL1 to DLm in response to a data drive control signal DDC supplied by the timing controller 190. The data driving unit 120 samples the digital video data RGB supplied from the timing controller 190, latches the sampled data, converts the latched data to analog data voltage for representing a gray scale in the liquid crystal cell Clc of the liquid crystal display panel 110 with reference to the gamma reference voltage supplied from the gamma reference voltage generating unit 140, and then supplies the analog data voltage to the data lines DL1 to DLm.

The gate driving unit 130 responds to a gate driving control signal GDC and a gate shift clock GSC supplied from the timing controller 190, generates scan pulses, i.e., gate pulses sequentially, and then supplies the gate pulses to the gate lines GL1 to GLn, respectively. In this case, the gate driving unit 130 determines a high level voltage and a low level voltage of each of the scan pulses according to the gate high voltage VGH and the gate low voltage VGL supplied from the gate drive voltage generating unit 180.

The gamma reference voltage generating unit 140 is supplied with a highest high-potential power voltage 2VDD among power voltages supplied to the liquid crystal display panel 110, generates a positive gamma reference voltage and a negative gamma reference voltage, and then outputs the positive and negative gamma reference voltages to the data driving unit 120.

The backlight assembly 150 is provided to a backside of the liquid crystal display panel 110. The backlight assembly 150 emits light by the alternating current and voltage supplied from the inverter 160 and then applies the emitted light to each pixel of the liquid crystal display panel 110.

The inverter 160 converts a square wave signal generated inside to a triangular wave signal, compares the triangular wave signal to the DC power voltage VCC supplied from the system, and then generates a burst dimming signal proportional to the comparison result. Thus, if the burst dimming signal determined according to the square wave signal inside is generated, a driving IC (not shown in the drawing) controlling the generation of the alternating current and voltage within the inverter 160 controls the generation of the alternating current and voltage supplied to the backlight assembly 150 according to the burst dimming signal.

The common voltage generating unit 170 generates the common voltage Vcom by being supplied with the high-potential power voltage VDD and then supplies the common voltage to the common electrode of the liquid crystal cells Clc provided to each pixel of the liquid crystal display panel 110.

The gate drive voltage generating unit 180 is supplied with the high-potential power voltage VDD, generates the gate high voltage VGH and the gate low voltage VGL, and then supplies the generated voltages to the gate 4 driving unit 130. In particular, the gate drive voltage generating unit 180 generates the gate high voltage VGH equal to or greater than a threshold voltage of the TFT provided to each pixel of the liquid crystal display panel 110 and the gate low voltage VGL smaller than the threshold voltage of the TFT. The generated gate high and low voltages VGH and VLH are used to determine high and low level voltages of the scan pulse generated by the gate driving unit 130, respectively.

The timing controller 190 supplies the digital video data RGB supplied from a digital video card (not shown in the drawing) to the data driving unit 120. The timing controller 190 generates a data drive control signal DDC and a gate drive control signal GDC using horizontal and vertical sync signals H and V according to a clock signal CLK and then supplies the data drive control signal DDC and the gate drive control signal GDC to the data driving unit 120 and the gate driving unit 130, respectively. In this case, the data drive control signal DDC includes a source shift clock SSC, a source start pulse SSP, a polarity control signal POL, a source output enable signal SOE and the like and the gate drive control signal GDC includes a gate start pulse GSP, a gate output enable signal GOE and the like.

Figure 2:
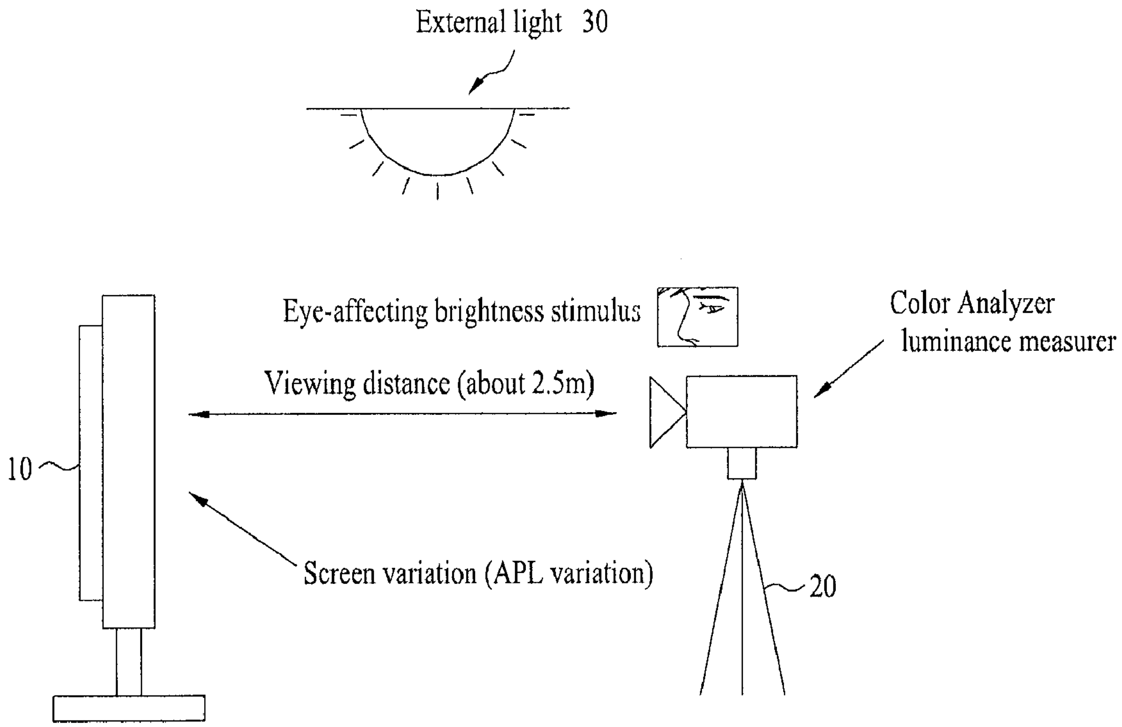
FIG. 2 is a test diagram for explaining a backlight brightness control of a liquid crystal display according to an embodiment of the present invention.
Figure 3:
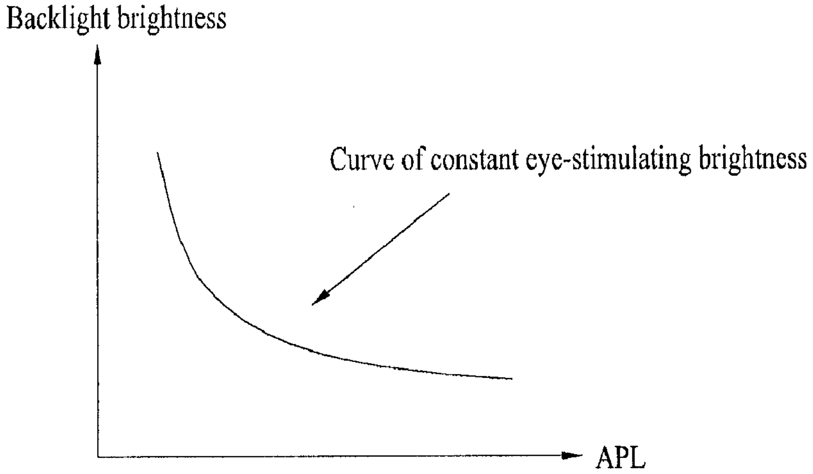
FIG. 3 is a graph of a brightness curve of a backlight according to APL of the test shown in FIG. 2.

FIG. 2 is a test diagram for explaining a backlight brightness control of a liquid crystal display according to an embodiment of the present invention, and FIG. 3 is a graph of a brightness curve of a backlight according to APL of the test shown in FIG. 2.

In FIG. 2, if a voltage, a current and a PWM (pulse width modulation pulse is supplied to a voltage/current/PWM control circuit, an LCD backlight brightness controller within a video display device according to the present invention converts it to a DC voltage set by the voltage/current/PWM control circuit, e.g., 3.3 V according to a set dimming value and then outputs the corresponding voltage to an LCD module driver. The LCD module driver drives a backlight according to the inputted DV voltage and then displays a picture on an LCD panel.

Referring to FIG. 2, the present invention obtains a graph result for maintaining brightness of light, which stimulates eyes, uniform by controlling brightness of a backlight according to the screen brightness (APL) through a real test for measuring brightness of a liquid crystal display 10 using a luminance measurer 20.

Through the correlation of the graph shown in FIG. 3, when a specific picture is made still, brightness of light stimulating eyes can be represented as Formula 1.

Eye-stimulating brightness=backlight brightness*screen size*APL [Formula 1]

In Formula 1, if the uniform eye-stimulating brightness is set to a constant 'L', the backlight brightness can be expressed as Formula 2.

Backlight brightness=1/(L*screen size*APL) [Formula 2]

In Formula 2, since both of the screen size and the L are the constants, the brightness adjustment of the backlight to cause uniform eye stimulation can be represented as "backlight brightness$\propto$1/APL". And, the backlight brightness, as shown in FIG. 3, follows the trace inverse-proportional to the APL. Hence, the backlight is adjusted dimmer as the average picture level (APL) gets higher. And, the backlight is adjusted brighter as the average picture level (APL) gets lower.

Therefore, the present invention detects APL, which can represent the intensity of radiation coming from a screen, and maintains the intensity of eye-stimulating radiation uniform according to each APL in a manner of adjusting a backlight of LCD, thereby reducing fatigue caused to eyes of a viewer who is watching TV.

Figure 4:
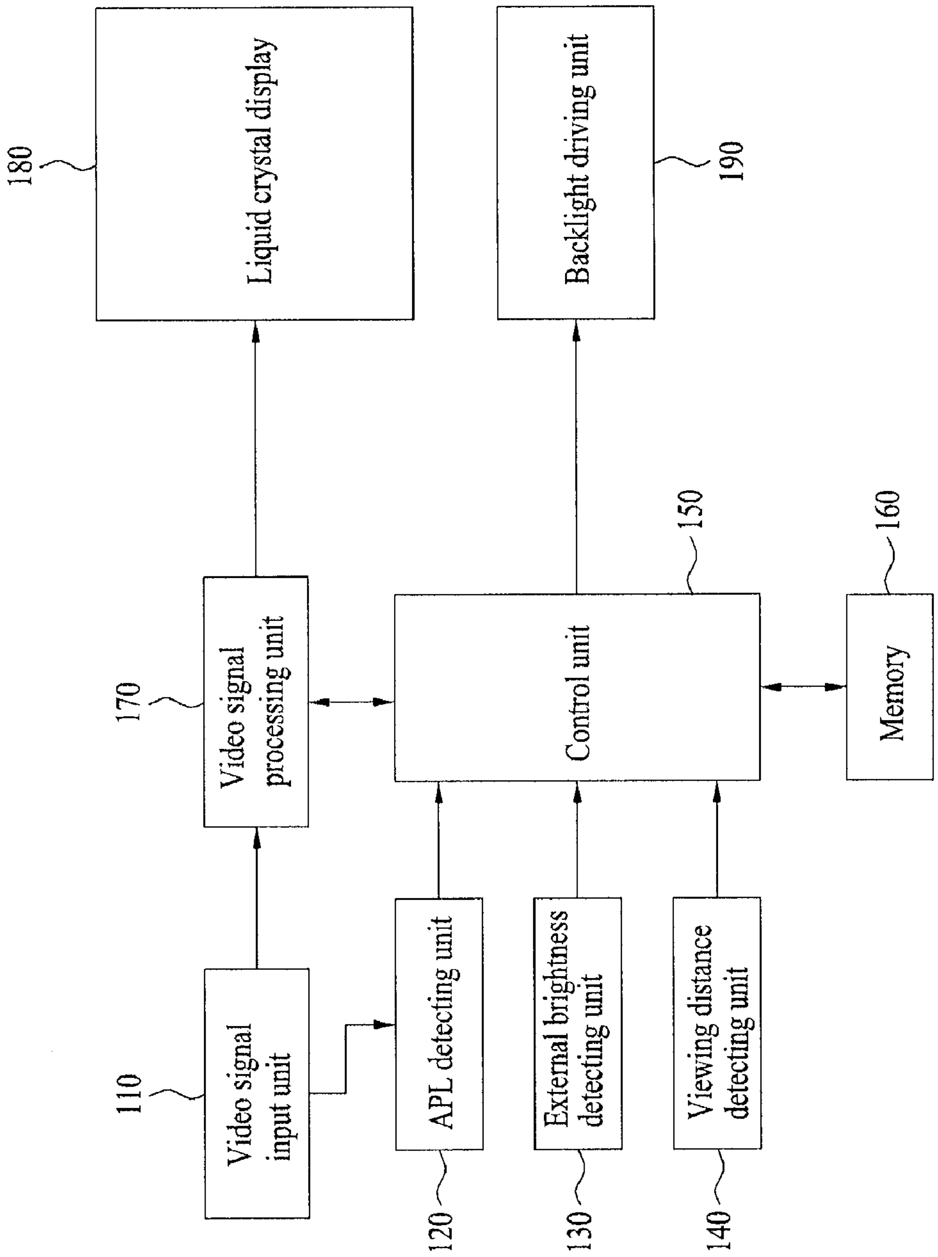
FIG. 4 is a block diagram of a liquid crystal display for controlling the backlight brightness according to an embodiment of the present invention.

FIG. 4 is a block diagram of a liquid crystal display for controlling the backlight brightness according to an embodiment of the present invention. And, FIG. 5 is a graph of the compensated brightness of a backlight attributed to APL values by reflecting surrounding brightness and viewing distance according to an embodiment of the present invention.

Figure 5:
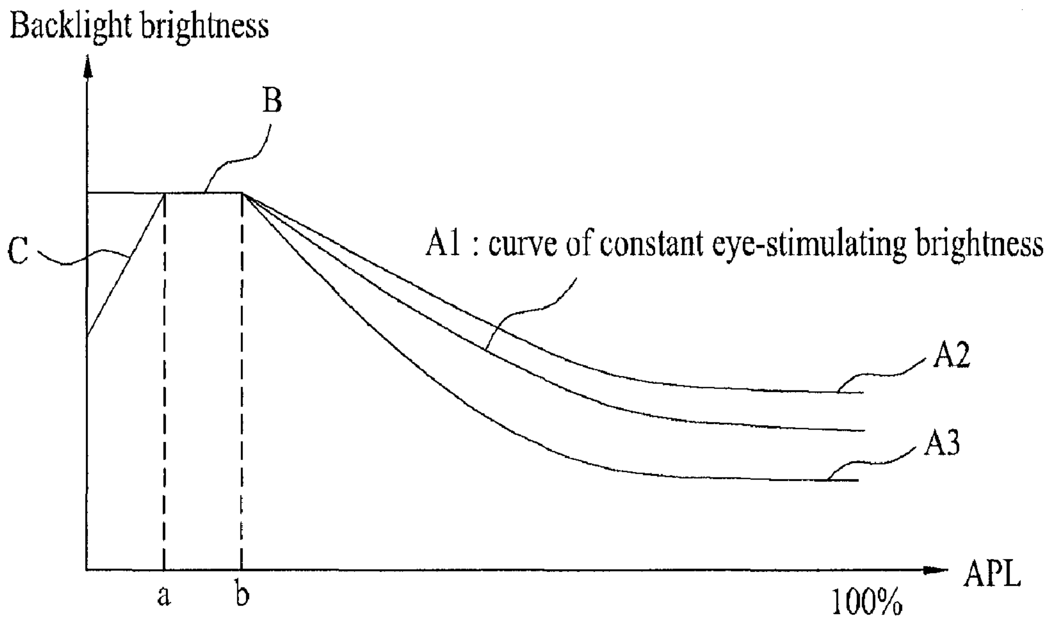
FIG. 5 is a graph of the compensated brightness of a backlight attributed to APL values by reflecting surrounding brightness and viewing distance according to an embodiment of the present invention.

Referring to FIG. 4 and FIG. 5, a liquid crystal display for correcting brightness of a backlight in accordance with an average picture level (APL) according to the present invention includes a video signal input unit 110, an APL detecting unit 120, an external brightness detecting unit 130, a viewing distance detecting unit 140, a control unit 150, a memory 160, a video signal processing unit 170, a liquid crystal display 180, and a backlight driving unit 190.

The video signal input unit 110 receives a video signal and then output video data of a frame unit.

The APL detecting unit 120 detects a value of average picture level (APL) from the frame-unit video data outputted from the video signal input unit 110.

The external brightness detecting unit 130 detects brightness around an LCD panel and then outputs a dimming vector value according to the detected brightness. For instance, if the surrounding brightness ranges from a dark case to a bright case, the external brightness detecting unit 130 outputs various dimming vector values from 0 V to 3.3V. The external brightness detecting unit 130 flexibly outputs the dimming vector value according to the surrounding brightness. For instance, in case that the surrounding brightness is very high, the external brightness detecting unit 130 outputs the dimming vector value of 3.3V. In case that the surrounding brightness is low, the external brightness detecting unit 130 outputs the dimming vector value of 2V or 0V.

The viewing distance detecting unit 140 detects a viewing distance according to a time difference of a reflective wave reflecting from a viewer using an ultrasonic transceiver or the like.

The control unit 150 increases or decreases brightness of a backlight uniformly in inverse proportion to the APL value detected by the APL detecting unit 120. The control unit 150 increases the brightness of the backlight according to the decrement of the APL value but limits the brightness of the backlight to a prescribed brightness for a preset reference section. The control unit 150 controls the brightness of the backlight according to the APL value based on the dimming vector value outputted from the external brightness detecting unit 130. Moreover, the control unit 150 controls the brightness of the backlight according to the APL value based on the viewing distance detected by the viewing distance detecting unit 140. In this case, the control unit 150 adjusts the backlight brightness based on a lookup table (LUT) which maps a backlight brightness control value in correspondence to APL value, surrounding brightness and viewing distance from the memory 160. IN this case, the memory 160 can include various kinds of semiconductor devices including EEPROM (electrically erasable and programmable read only memory) or a hard disk (HDD).

In case that the APL value is equal to or smaller than a reference value, the brightness affecting viewer's eyes is very small. Therefore, the control unit 150 controls the brightness of the backlight to decrease. If the APL is decreased equal to or smaller than the reference value, the control unit 150 controls the brightness of the backlight to be decreased for the value avoiding light leakage only. The control unit 150 can include a microprocessor, central processing unit (CPU) or a microprocessor unit (MPU), which has a general operation and control decision function.

The video signal processing unit 170 processes a video signal outputted from the video signal input unit 110 and enables the processed video signal to be played on the liquid crystal display 180.

The backlight driving unit 190 drives the backlight in a manner of adjusting the rightness of the backlight according to a control signal outputted from the control unit 150.

The control unit 150 controls the brightness of the backlight based on the average picture level (APL) value, surrounding brightness and viewing distance in the following manner according to the graph shown in FIG. 5. In this graph, there exist a section A1, in which the backlight brightness is uniformly inverse-proportional over a prescribed APL value in a reference surrounding brightness and a viewing distance, a section B for limiting the backlight brightness to a prescribed brightness without raising the brightness indefinitely for a section having a low APL value, and a section C for reducing the backlight brightness for the value avoiding light leakage only in case of an APL value equal to or smaller than a reference value.

According to another embodiment of the present invention, the brightness of the backlight is compensated by reflecting brightness of a surrounding light source or a user's viewing distance as well as an average picture level (APL) value. In particular, when an average picture level (APL) value is equal to or greater than a setup value, if a brightness of a surrounding light source is higher than a reference value or a viewing distance is greater than a reference value, the brightness of the backlight according to APL is compensated by applying the graph section A2 having a proportional constant greater than the reference value A1.

When an average picture level (APL) value is equal to or greater than a setup value, if a brightness of a surrounding light source is lower than a reference value or a viewing distance is smaller than a reference value, the brightness of the backlight according to APL is compensated by applying the graph section A2 having a proportional constant smaller than the reference value A1.

Figure 6:
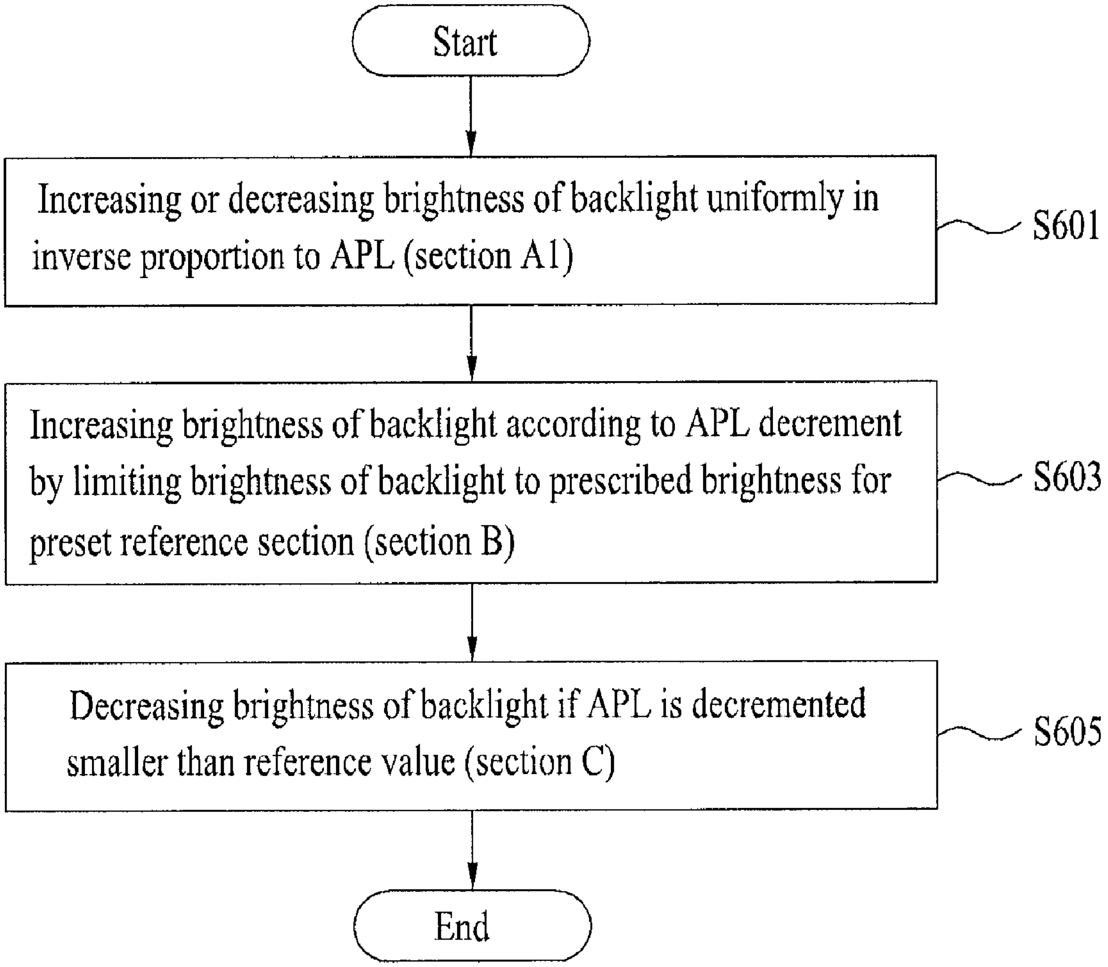
FIG. 6 is a control flowchart for a method of controlling a brightness of a backlight of a liquid crystal display due to APL values according to an embodiment of the present invention.

FIG. 6 is a control flowchart for a dazzling preventing method in a liquid crystal display according to an embodiment of the present invention.

Referring to FIG. 6, in a method of controlling a brightness of a backlight in a liquid crystal display for correcting the backlight brightness according to an average picture level (APL), the present invention performs a step S601 of increasing or decreasing the backlight brightness uniformly in inverse proportion to the APL.

In particular, the APL detecting unit 120 detects APL of video frame data outputted from the video signal input unit 110. The control unit 150 increases or decreases the brightness of the backlight uniformly in inverse proportion to the APL value detected by the APL detecting unit 120.

Therefore, referring to FIG. 5, as a curve of eye-stimulating brightness is formed uniform in the section A1, it is able to increase or decrease the brightness of the backlight uniformly in inverse proportion.

Subsequently, a step S603 of limiting the brightness of the backlight to a prescribed brightness in a preset reference section is performed when the brightness of the backlight is increased according to the decrement of the APL.

In particular, according to the decrement of the APL value, the control unit 150 increases the brightness of the backlight. In doing so, the brightness of the backlight is limited to the prescribed brightness in the preset reference section.

Therefore, referring to FIG. 5, it is unable to indefinitely raise the brightness for a considerably low APL section of the section B. As the brightness affecting eyes is very small, a uniform limit value is taken.

In case that the APL is decremented equal to or smaller than the reference value, a step S605 of decreasing the brightness of the backlight is performed.

In particular, the control unit 150 decreases the brightness of the backlight if the APL is decremented equal to or smaller than the reference value. Therefore, referring to FIG. 5, it is able to design the section C in a manner that the brightness of the backlight is intentionally decreased in the considerably low APL section to prevent light leakage of LCD TV.

Accordingly, the backlight brightness decreasing step S605 decreases the brightness of the backlight in proportion to the APL. If the APL is decremented equal to or smaller than the reference value, the step S605 is able to decrease the brightness of the backlight to the value avoiding the light leakage.

Figure 7:
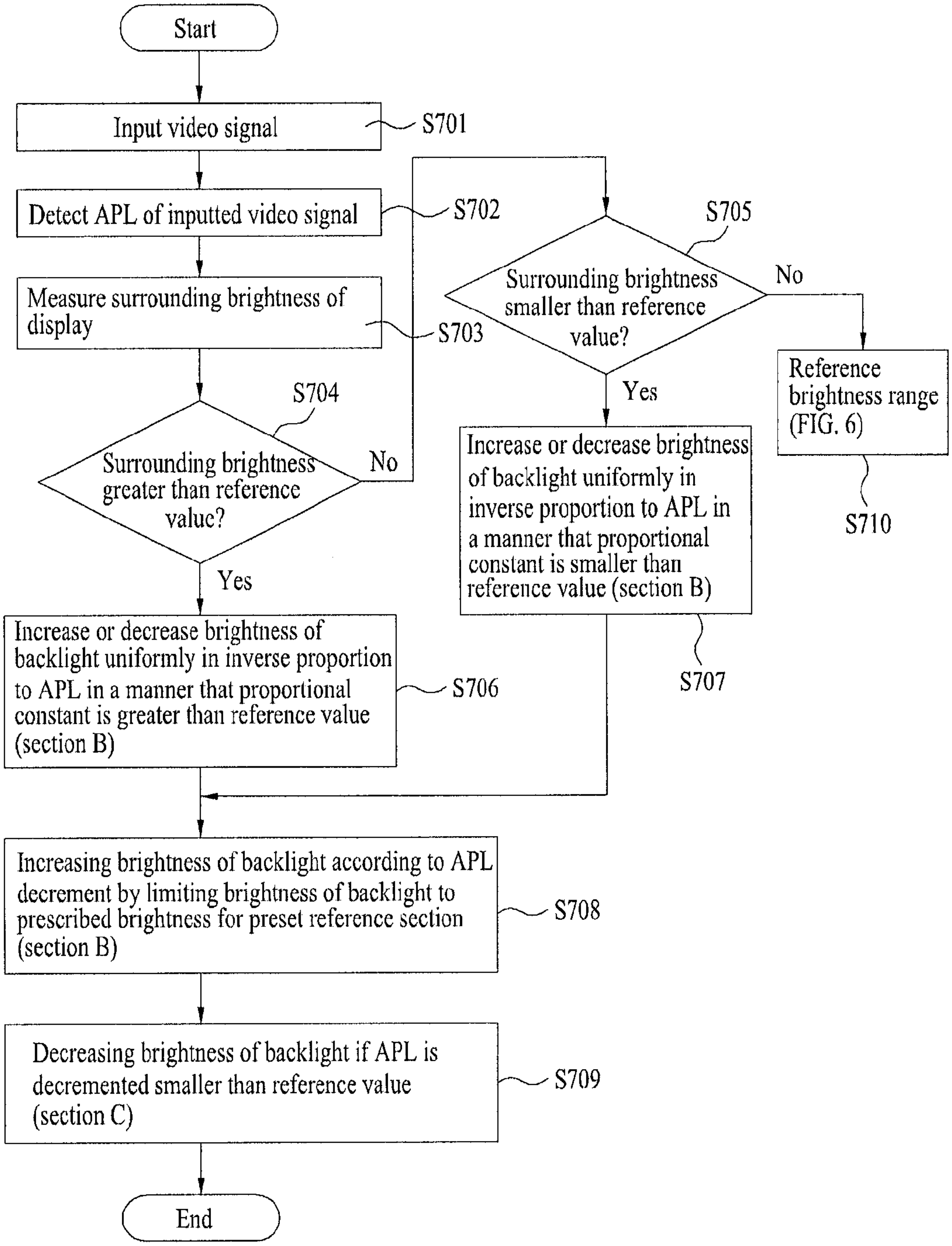
FIG. 7 is a control flowchart for a method of controlling a brightness of a backlight of a liquid crystal display due to APL values by reflecting surrounding brightness according to another embodiment of the present invention.

FIG. 7 is a control flowchart for a method of controlling a brightness of a backlight of a liquid crystal display due to APL values by reflecting surrounding brightness according to another embodiment of the present invention.

Referring to FIG. 7, a video signal stored by a frame unit is inputted [S701].

An average picture level (APL) value of the inputted video signal is detected [S702].

Brightness of a liquid crystal display surrounding light source is measured [S703]. In particular, a brightness of LCD56 panel surrounding is detected and a dimming vector value according to the detected brightness is then outputted. For instance, various dimming vector values ranging 0V to 3.3V for covering a dark surrounding brightness case to a bright case.

The measured brightness of the surrounding light source is compared to a set reference value [S704]. If the measured brightness value is greater than the reference value, the brightness of the backlight is increased or decreased in an inverse-proportional curve, in which a proportional constant is greater than the reference value like the section A2, according to a detected average picture level (APL) [S706].

The measured brightness of the surrounding light source is compared to a set reference value [S705]. If the measured brightness value is smaller than the reference value, the brightness of the backlight is increased or decreased in an inverse-proportional curve, in which a proportional constant is smaller than the reference value like the section A3, according to a detected average picture level (APL) [S707].

Subsequently, in case that the detected average picture level (APL) is decremented, the brightness of the backlight is increased by limiting the brightness of the backlight to a prescribed brightness in a preset reference section (section a~b in FIG. 5) [S708].

Thus, referring to FIG. 5, it is unable to indefinitely increase the brightness of the backlight for the considerably low APL section in the section B. Since the brightness affecting eyes is very small, a predetermined limit value is taken in the section B.

If the APL is decremented equal to or smaller than the reference value, the brightness of the backlight is decreased [S709].

In particular, referring to FIG. 5, the brightness of the backlight is decreased if the APL is decremented equal to or smaller than the reference value (a). Therefore, it is able to design the section C in a manner that the brightness of the backlight is intentionally decreased in the considerably low APL section to prevent light leakage of LCD TV.

If the measured brightness of the surrounding light source lies within the range of the set reference value, it is able to increase or decrease the brightness of the backlight uniformly in inverse proportion by forming a uniform curve having a proportional constant of the reference value like the step S601 of FIG. 6 [S710].

Figure 8:
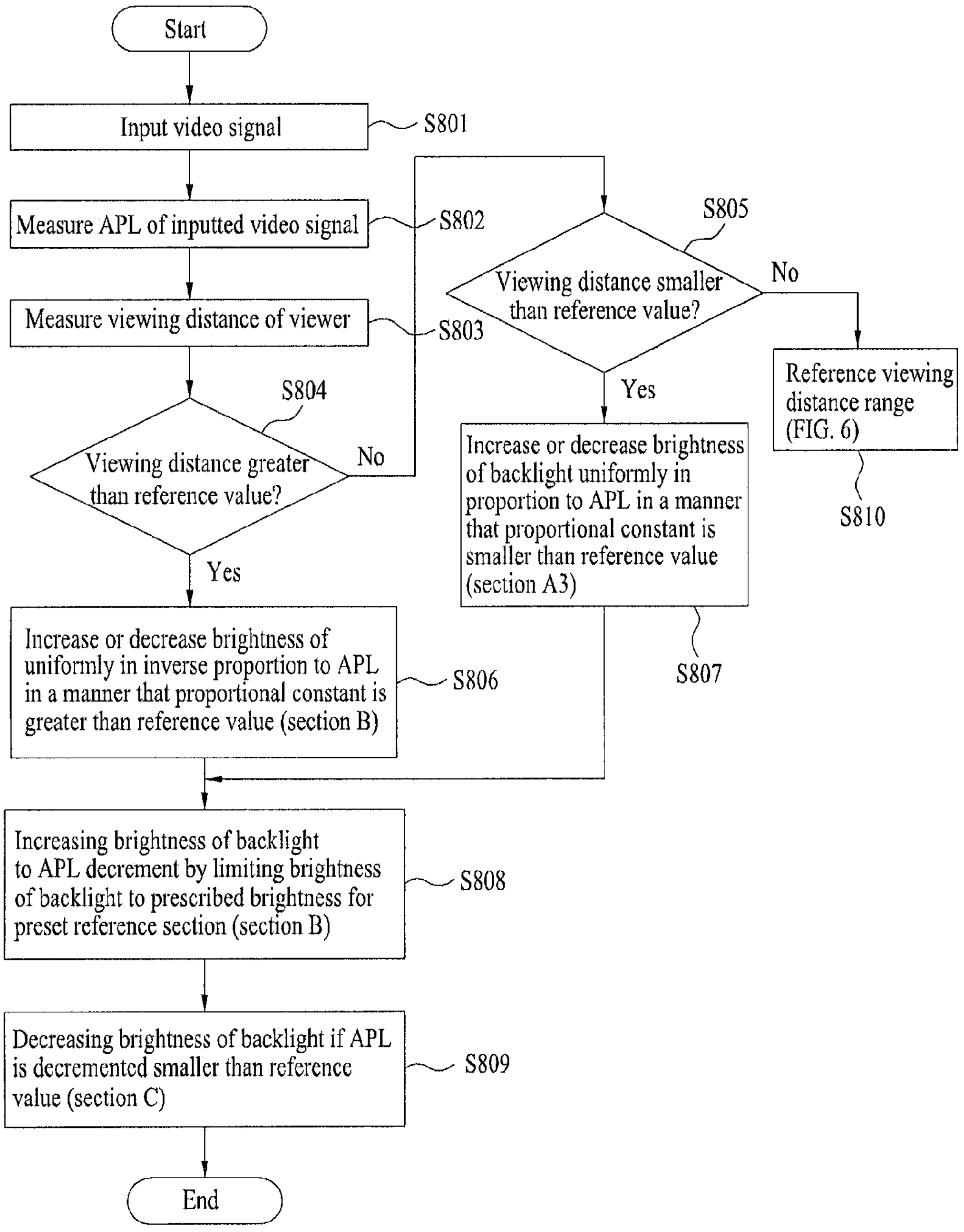
FIG. 8 is a control flowchart for a method of controlling a brightness of a backlight of a liquid crystal display due to APL values by reflecting a viewing distance according to another embodiment of the present invention.

FIG. 8 is a control flowchart for a method of controlling a brightness of a backlight of a liquid crystal display due to APL values by reflecting a viewing distance according to another embodiment of the present invention.

Referring to FIG. 8, a video signal stored by a frame unit is inputted [S801].

An average picture level (APL) value of the inputted video signal is detected [S802].

Viewing distance of a user from a liquid crystal display is measured [S803]. In particular, the viewing distance resulting from a time difference of a reflective eave reflecting from the viewer is measured using an ultrasonic transceiver or the like.

The measured viewing distance is compared to a set reference value [S804]. If the measured viewing distance is greater than the reference value, the brightness of the backlight is increased or decreased in an inverse-proportional curve, in which a proportional constant is greater than the reference value like the section A2, according to a detected average picture level (APL) [S806].

The measured viewing distance is compared to a set reference value [S805]. If the measured viewing distance is smaller than the reference value, the brightness of the backlight is increased or decreased in an inverse-proportional curve, in which a proportional constant is smaller than the reference value like the section A3, according to a detected average picture level (APL) [S807].

Subsequently, in case that the detected average picture level (APL) is decremented, the brightness of the backlight is increased by limiting the brightness of the backlight to a prescribed brightness in a preset reference section (section a~b in FIG. 5) [S808].

Thus, referring to FIG. 5, it is unable to indefinitely increase the brightness of the backlight for the considerably low APL section in the section B. Since the brightness affecting eyes is very small, a predetermined limit value is taken in the section B.

If the APL is decremented equal to or smaller than the reference value, the brightness of the backlight is decreased [S809].

In particular, referring to FIG. 5, the brightness of the backlight is decreased if the APL is decremented equal to or smaller than the reference value (a). Therefore, it is able to design the section C in a manner that the brightness of the backlight is intentionally decreased in the considerably low APL section to prevent light leakage of LCD TV.

If the measured viewing distance lies within the range of the set reference value, it is able to increase or decrease the brightness of the backlight uniformly in inverse proportion by forming a uniform curve having a proportional constant of the reference value like the step S601 of FIG. 6 [S810].

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, in an LCD TV, when a viewer watches a TV, if a screen is too bright or the intensity of light stimulating viewer's eyes varies according to a picture on the screen, fatigue is caused to the eyes to become one of problems caused by the LCD TV. To prevent this problem, the fatigue caused to the eyes is reduced by maintaining the intensity of radiation stimulating the eyes uniformly, whereby the dazzling problem of the LCD TV is solved to settle the inconvenience caused to viewers. Therefore, the viewer's health can be secured and the enhanced functions of the LCD TV can be implemented.

The above-described present invention is applicable to a set-top box, a projection TV, a general TV, a monitor and other video devices as well as such a flat panel monitor such as a PDP, an LCD and the like. And, the present invention is applicable to an analogue TV, a digital TV and a satellite TV in the same manner. Moreover, the present invention is applicable to NTSC, PAL and SECAM systems as well.

What is claimed is:

1. A method of controlling a brightness of a liquid crystal display, comprising:

inputting a video signal by a frame unit;

detecting an average picture level (APL) value of the inputted video signal;

if the detected average picture level (APL) value is equal to or greater than a reference value, increasing or decreasing a brightness of a backlight according to an inverse proportional curve having a prescribed proportional constant; and if the detected average picture level (APL) value is smaller than a reference value, increasing the brightness of the backlight according to the average picture level (APL) value by limiting the brightness of the backlight to a prescribed brightness for a preset reference section of an average picture level (APL), wherein the inverse proportional curve having the prescribed proportional constant (L) is based on the following formula: Backlight brightness=1/(L*screen size*APL), where L is a constant of brightness stimulating eyes.

2. The method of claim 1, wherein if the detected APL is decremented smaller than the reference value, the brightness of the backlight is decreased to a value for avoiding light leakage only.

3. The method of claim 1, further comprising:

if the detected APL is equal to or greater than the reference value, measuring a surrounding brightness of the liquid crystal display;

comparing the measured surrounding brightness to a set reference value; and if the measured surrounding brightness is greater than the reference value, increasing or decreasing the brightness of the backlight according to an inverse proportional curve greater than the prescribed proportional constant.

4. The method of claim 3, further comprising:

if the measured surrounding brightness is smaller than the reference value, increasing or decreasing the brightness of the backlight according to an inverse proportional curve smaller than the prescribed proportional constant.

5. The method of claim 1, further comprising:

if the detected APL is equal to or greater than the reference value, measuring a viewing distance of a user from the liquid crystal display;

comparing the measured viewing distance to a set reference value; and if the measured viewing distance is greater than the reference value, increasing or decreasing the brightness of the backlight according to an inverse proportional curve greater than the prescribed proportional constant.

6. The method of claim 5, further comprising:

if the measured viewing distance is smaller than the reference value, increasing or decreasing the brightness of the backlight according to an inverse proportional curve smaller than the prescribed proportional constant.

7. A liquid crystal display comprising:

a video signal input to input a video signal by a frame unit, the video signal input unit outputting the inputted video signal as video data by a frame unit;

a detector to detect an average picture level (APL) value of the video data outputted from the video signal input;

a controller to:

(a) increase or decrease a brightness of a backlight according to an inverse proportional curve having a prescribed proportional constant when the detected APL value is equal to or greater than a reference value, and (b) increase the brightness of the backlight according to the APL value by limiting the brightness of the backlight to a prescribed brightness for a preset reference section of an average picture level when the detected APL value is smaller than a reference value;

a memory storing a lookup table (LUT) for mapping a backlight brightness control value corresponding to the APL value; and a backlight driver to drive the backlight by controlling the brightness of the backlight under the control of the controller, wherein the inverse proportional curve having the prescribed proportional constant (L) is based on the formula: Backlight brightness=1/(L*screen size*APL), where L is a constant of brightness stimulating eyes.

8. The liquid crystal display of claim 7, wherein if the detected APL value is decremented smaller than the reference value, the controller controls the brightness of the backlight to be decreased to a value for avoiding light leakage only.

9. A liquid crystal display comprising:

a video signal input to input unit a video signal by a frame unit, the video signal input outputting the inputted video signal as video data by a frame unit;

a detector to detect an average picture level (APL) value of the video data outputted from the video signal input;

an external brightness detector to detect a surrounding brightness value of the liquid crystal display;

a controller to:

(a) increase or decrease a brightness of a backlight according to an inverse proportional curve having a prescribed proportional constant when the detected APL value is equal to or greater than a reference value based on the detected surrounding brightness value, and (b) increase the brightness of the backlight according to the APL value by limiting the brightness of the backlight to a prescribed brightness for a preset reference section of an average picture level when the detected APL value is smaller than a reference value;

a memory to store storing a lookup table (LUT) for mapping the APL value and a backlight brightness control value corresponding to the surrounding brightness value; and a driver to drive the backlight by controlling the brightness of the backlight under the control of the controller unit, wherein the inverse proportional curve having the prescribed proportional constant (L) is based on the following formula: Backlight brightness=1/(L*screen size*APL), where L is a constant of brightness stimulating eyes.

10. The liquid crystal display of claim 9, wherein if the detected APL value is decremented smaller than the reference value, the controller unit controls the brightness of the backlight to be decreased to a value for avoiding light leakage only.

11. The liquid crystal display of claim 9, wherein if the detected APL value is equal to or greater than the reference value and if the measured surrounding brightness value is greater than a set reference value, the controller increases or decreases the brightness of the backlight according to an inverse proportional curve greater than the prescribed proportional constant.

12. The liquid crystal display of claim 9, wherein if the detected APL value is equal to or greater than the reference value and if the measured surrounding brightness value is smaller than a set reference value, the controller unit increases or decreases the brightness of the backlight according to an inverse proportional curve smaller than the prescribed proportional constant.

13. The liquid crystal display of claim 9, wherein the external brightness detector measures the surrounding brightness value and then outputs a dimming vector value.

14. A liquid crystal display comprising:

a video signal input to input a video signal by a frame unit, the video signal input unit outputting the inputted video signal as video data by a frame unit;

a detector to detect an average picture level (APL) value of the video data outputted from the video signal input;

a viewing distance detector to detect a viewing distance of a viewer from the liquid crystal display;

a controller to:

(a) increase or decrease a brightness of a backlight according to an inverse proportional curve having a. prescribed proportional constant when the detected APL value is equal to or greater than a reference value based on the measured viewing distance, and (b) increase the brightness of the backlight according to the APL value by limiting the brightness of the backlight to a prescribed brightness for a preset reference section of an average picture level when the detected APL value is smaller than a reference value;

a memory to store a lookup table (LUT) for mapping the APL value and a backlight brightness control value corresponding to the viewing distance; and a backlight driver to drive the backlight by controlling the brightness of the backlight under the control of the controller, wherein the inverse proportional curve having the prescribed proportional constant (L) is based on the following formula: Backlight brightness=1/(L*screen size*APL), where L is a constant of brightness stimulating eyes.

15. The liquid crystal display of claim 14, wherein if the detected APL value is decremented smaller than the reference value, the controller controls the brightness of the backlight to be decreased to a value for avoiding light leakage only.

16. The liquid crystal display of claim 14, wherein if the detected APL value is equal to or greater than the reference value and if the measured viewing distance is greater than a set reference value, the controller increases or decreases the brightness of the backlight according to an inverse proportional curve greater than the prescribed proportional constant.

17. The liquid crystal display of claim 14, wherein if the detected APL value is equal to or greater than the reference value and if the measured viewing distance is smaller than a set reference value, the controller increases or decreases the brightness of the backlight according to an inverse proportional curve smaller than the prescribed proportional constant.

18. The liquid crystal display of claim 14, wherein the viewing distance detector detects the viewing distance resulting from a time difference based on a reflective wave reflecting from the a viewer using an ultrasonic wave transceiver.

* * * * *